United States Patent [19]

Yasuda

[11] Patent Number: 5,386,588
[45] Date of Patent: Jan. 31, 1995

[54] TRANSMISSION POWER CONTROL OF MOBILE RADIOTELEPHONE STATION IN RESPONSE TO BASE STATION CONTROL SIGNAL WHERE BASE STATION DATA IS COLLECTED BY THE MOBILE RADIOTELEPHONE STATION

[75] Inventor: Hiroshi Yasuda, Kanagawa, Japan

[73] Assignee: Sony Corporation, Tokyo, Japan

[21] Appl. No.: 716,002

[22] Filed: Jun. 17, 1991

[30] Foreign Application Priority Data

Jun. 19, 1990 [JP] Japan .................. 2-160227

[51] Int. Cl.⁶ ............................................. H04Q 7/00
[52] U.S. Cl. ................... 455/33.1; 455/56.1; 455/69; 379/59
[58] Field of Search ............. 455/33.1, 33.2, 52.1, 455/54.1, 54.2, 56.1, 69, 126; 379/60, 59

[56] References Cited

U.S. PATENT DOCUMENTS

| | | | |
|---|---|---|---|
| 3,906,166 | 9/1975 | Cooper et al. | 455/56.1 X |
| 4,435,840 | 3/1984 | Kojima et al. | 455/56.1 X |
| 4,811,421 | 3/1989 | Havel et al. | 455/52.1 X |
| 5,038,399 | 8/1991 | Brucket | 455/54.1 X |
| 5,042,082 | 8/1991 | Dahlin | 455/33.2 |
| 5,056,109 | 10/1991 | Gilhousen et al. | 455/54.1 X |

FOREIGN PATENT DOCUMENTS

| | | |
|---|---|---|
| 0458158A2 | 11/1991 | European Pat. Off. . |
| 3200965A1 | 7/1983 | Germany . |
| WO8400654 | 2/1984 | WIPO . |

*Primary Examiner*—Curtis Kuntz
*Assistant Examiner*—Edward Urban
*Attorney, Agent, or Firm*—Limbach & Limbach

[57] ABSTRACT

A radiotelephone communication system is provided, in which radio communication channels including control channels and a plurality of communication channels are set between a plurality of base stations and a plurality of mobile stations provided within radio zones of the base stations, an outgoing call and an incoming call are controlled and the communication channels are designated via the control channels, a telephone conversation is made via the communication channels, channels of different frequencies are allocated to adjacent radio zones of the radio zones, each base station includes a circuit for detecting receiving electric field intensity of mobile station and the channel, the base station and operation of radio transmitter and receiver of the mobile station are set such that, when the mobile station is moved between the radio zones, the mobile station is constantly connected to the base station whose communication state is satisfactory. In this radiotelephone communication system, the mobile station is comprised of a circuit for detecting receiving electric field intensities of transmission signals of the plurality of base stations, a memory for storing data associated with detected receiving electric field intensity, and a circuit for transmitting an information associated with the data to the base stations via a up-channel, wherein the base station analyzes the information associated with the data transmitted from the mobile station and sets a transmission power of a mobile station which transmits the data or receiving and transmitting conditions between the radio zones in response to the analyzed result.

3 Claims, 6 Drawing Sheets

TRANSMISSION POWER CONTROL OF MOBILE RADIOTELEPHONE STATION IN RESPONSE TO BASE STATION CONTROL SIGNAL WHERE BASE STATION DATA IS COLLECTED BY THE MOBILE RADIOTELEPHONE STATION

BACKGROUND OF THE INVENTION

1. Field of the Invention

The present invention generally relates to mobile radio communication systems and, more particularly, is directed to a radiotelephone communication system in which a fundamental principle of the cellular phone system can be realized.

2. Description of the Prior Art

In a small zone type mobile telephone system, that is, a so-called cellular phone system, a transmission distance of radio waves is minimized and a frequency is repeatedly utilized from a plane standpoint (from an area standpoint) to thereby increase telephone subscriber capacity of the cellular phone system.

As, for example, shown in FIG. 1, the service area is divided to provide a plurality of divided areas $A_1$ to $A_m$ and the divided areas $A_1$ to $A_m$ are divided to provide a plurality of radio zones (base station areas) $Z_1$ to $Z_n$. Base stations $B_1$ to $Bn$ are provided in these radio zones $Z_1$ to $Z_n$, and a mobile station (radiotelephone) HS is provided in the radio zone $Z_9$.

In that case, control channels of different frequencies are allocated to the base stations $B_1$ to $B_n$, but when base stations are located in different areas and in the zones close to each other, control channels of different frequencies are allocated to the base stations $B_1$ to $B_n$. The base stations $B_1$ to $B_n$ are networked each other via a computer (not shown) which controls the base stations B1 to Bn, and communication channels of the base stations $B_1$ to $B_n$ are allocated.

In the case of FIG. 1, the mobile station HS is located within the zone $Z_3$ so that, when the mobile station HS transmits an outgoing call request signal, the base station $B_3$ of the zone $Z_3$ receives the transmitted wave from the mobile station HS at the largest electric field intensity and the base stations in other zones receive the transmitted wave from the mobile station HS at electric field intensity smaller than that of the base station $B_3$.

Accordingly, the control computer determines on the basis of the difference of electric field intensities that the mobile station HS is located in the base station $B_3$, and issues a command to the base station $B_3$ to open a communication channel between it and the mobile station HS. As a consequence, the communication channel is opened between the base station $B_3$ and the mobile station HS and the mobile station HS is connected through the base station $B_3$ to the telephone line network (not shown).

In the cellular phone system, the base stations $B_1$ to $B_n$ may be connected to the mobile station HS in their own zones, and the mobile station HS may be connected to the base station of one zone, thereby reducing the transmission distance of radio waves between the base stations $B_1$ to $B_n$ and the mobile station HS as much as possible. Therefore, the communication channel of the same frequency is repeatedly utilized even in the same service area, thus increasing the telephone subscriber capacity of this system.

In recent years, a small pocketable mobile station (radiotelephone) is commercially available so far, and accordingly, it is frequently observed that the user utilizes the mobile station in various places, such as mountain, highest floor of skyscraper, aircraft and so on.

However, when the mobile station is utilized in the high place, or when the mobile station HS makes an outgoing call request on the mountain as, for example, shown in FIG. 2, a transmitted radio wave from the mobile station HS is received by the base stations $B_1$ to $B_n$ at substantially the same electric field intensity or such transmitted radio wave is similarly received by other areas.

In this state, it is difficult to repeatedly utilize the frequency from an area standpoint and the fundamental idea of the cellular phone system or the principle itself is refused.

OBJECTS AND SUMMARY OF THE INVENTION

Accordingly, it is an object of the present invention to provide an improved radiotelephone communication system in which the aforementioned shortcomings and disadvantages encountered with the prior art can be eliminated.

More specifically, it is an object of the present invention to provide a radiotelephone communication system in which a fundamental principle of the cellular phone system can be realized.

It is another object of the present invention to provide a radiotelephone system in which a burden on a computer, which controls a base station, can be reduced.

As an aspect of the present invention, a radiotelephone communication system is provided, in which radio communication channels including control channels and a plurality of communication channels are set between a plurality of base stations and a plurality of mobile stations provided within radio zones of the base stations, an outgoing call and an incoming call are controlled and the communication channels are designated via the control channels, a telephone conversation is made via the communication channels, channels of different frequencies are allocated to adjacent radio zones of the radio zones, each base station includes a circuit for detecting receiving electric field intensity of mobile station and the channel, the base station and operation of radio transmitter and receiver of the mobile station are set such that, when the mobile station is moved between the radio zones, the mobile station is constantly connected to the base station whose communication state is satisfactory. In this radiotelephone communication system, the mobile station is comprised of a circuit for detecting receiving electric field intensities of transmission signals of the plurality of base stations, a memory for storing data associated with detected receiving electric field intensity, and a circuit for transmitting an information associated with the data to the base stations via a up-channel, wherein the base station analyzes the information associated with the data transmitted from the mobile station and sets a transmission power of a mobile station which transmits the data or receiving and transmitting conditions between the radio zones in response to the analyzed result.

The above, and other objects, features, and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Figure 3:
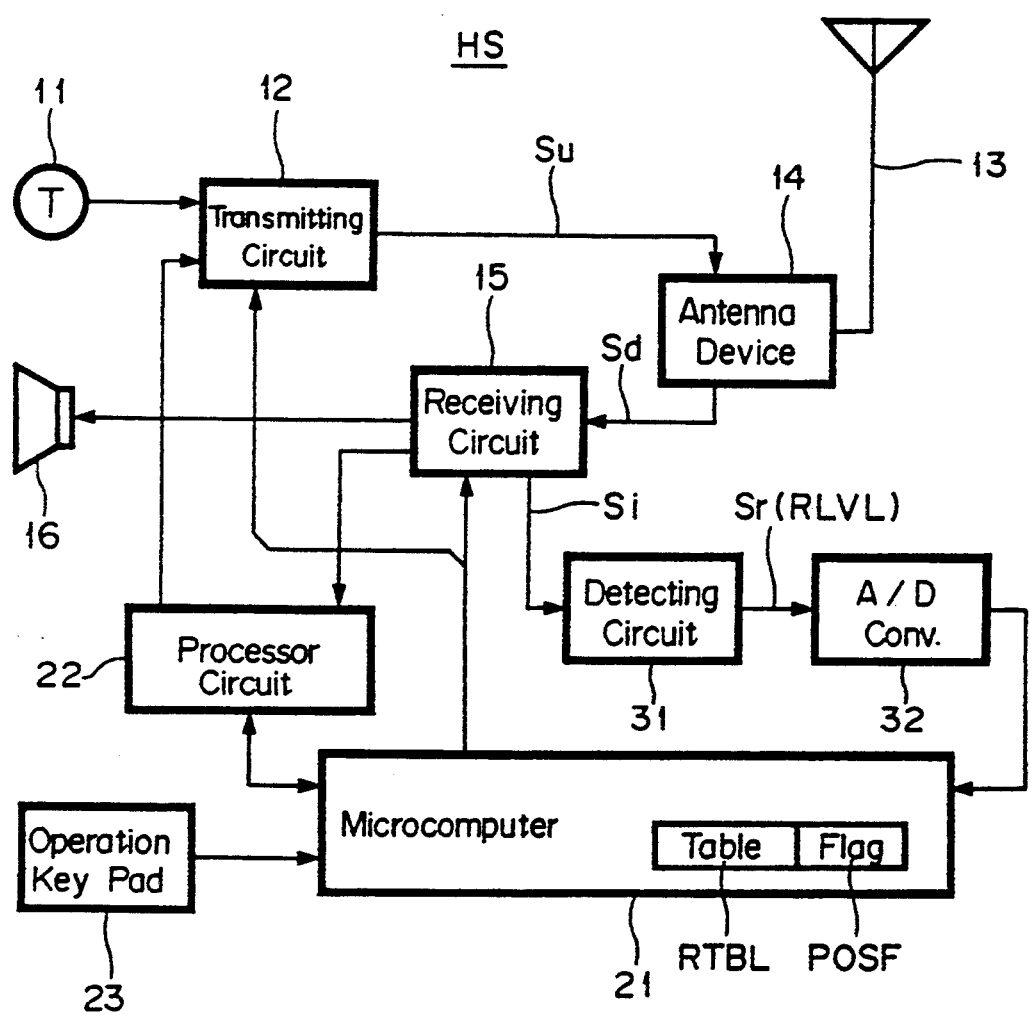
FIG. 3 is a schematic block diagram showing an example of a mobile station used in an embodiment of the radiotelephone communication system according to the present invention.

Referring to the drawings in detail, and initially to FIG. 3, a first embodiment of the present invention will be described in detail hereinafter. FIG. 3 shows in block form a mobile station HS wherein reference numeral 11 denotes a transmitter, 12 a transmitting circuit, 13 a transmission and reception antenna, 15 a receiving circuit and 16 a receiver.

The transmitting circuit 12 converts an audio signal and a control signal into an FM (frequency-modulated) signal Su of up channel and transmits the same to the base station. The receiving circuit 15 receives an FM signal Sd of down channel from the base station and demodulates the same to provide an audio signal and a control signal. The control signal is used to access various kinds of necessary communication informations between the mobile station HS and the base station.

A microcomputer 21 is adapted to control the entirety of this radiotelephone communication system, a processor circuit 22 is adapted to perform a predetermined transmission or reception processing on the control signal and an operation key pad 23 includes various kinds of keys, such as a dial key or the like.

The transmission and reception of the transmitting circuit 12 and the receiving circuit 15 are permitted or inhibited, the channel is designated and the transmission power of the transmitting circuit 12 is controlled under the control of the microcomputer 21. Further, the microcomputer 21 generates a control signal to be transmitted and determines the status of the received control signal.

When the control signal is generated from the microcomputer 21, this control signal is supplied to the processor circuit 22, in which it is converted to a transmission control signal. The thus converted control signal is supplied to the transmitting circuit 12, from which it is transmitted to the base station by means of the up channel. When the control signal is transmitted from the base station by means of the down channel, this control signal is supplied from the receiving circuit 15 to the processor circuit 22, in which it is converted to the original control signal. The thus converted control signal is supplied to the microcomputer 21.

When making an outgoing call and when receiving an incoming call, the mobile station HS and the base station are connected via up and down control channels.

When the mobile station HS and the base station are connected via the control channel, then a predetermined control signal is accessed by means of the control channel so that a frequency of the communication channel utilized between the mobile station HS and the base station is reported from the base station to the mobile station HS, thus up and down communication channels of the frequency reported by the base station being opened between the mobile station HS and the base station.

When the communication channel is opened, then a telephone communication is carried out between the mobile station HS and the caller via the communication channel and the base station.

More specifically, upon telephone communication, the audio signal from the transmitter 11 is supplied to the transmitting circuit 12, in which it is converted into the FM signal Su of up communication channel. This FM signal Su is supplied to an antenna device 14 to the antenna 13, from which it is transmitted to the base station.

The FM signal Sd of down communication channel from the base station is received at the antenna 13, and the thus received FM signal Sd is supplied through the antenna device 14 to the receiving circuit 15, in which it is demodulated to provide the audio signal. This audio signal is supplied to the receiver 16.

During the telephone conversation, the base station detects electric field intensity of the FM signal Su from the mobile station HS. Thus, when the mobile station HS is moved to change the wireless zone during the telephone conversation, electric field intensity of the signal received by the base station of the wireless zone is decreased and electric field intensity of the signal received by the base station of the wireless zone in which the mobile station HS is moved is increased, whereby a necessary control signal is accessed between the mobile station HS and the base station via the communication channel, thus a communication channel being opened between the mobile station HS and the base station in the wireless zone into which the mobile station HS is moved.

According to this invention, the mobile station HS is further constructed as follow.

That is, as shown in FIG. 3, the receiving circuit 15 derives an intermediate frequency signal Si. The intermediate frequency signal Si is supplied to the detecting circuit 31 which then produces a signal Sr which indicates the reception electric field intensity RLVL of the received FM signal Sd. This detected signal Sr is converted into a digital signal by an analog-to-digital (A/D) converter 32 and supplied to the microcomputer 21.

Figure 4A:
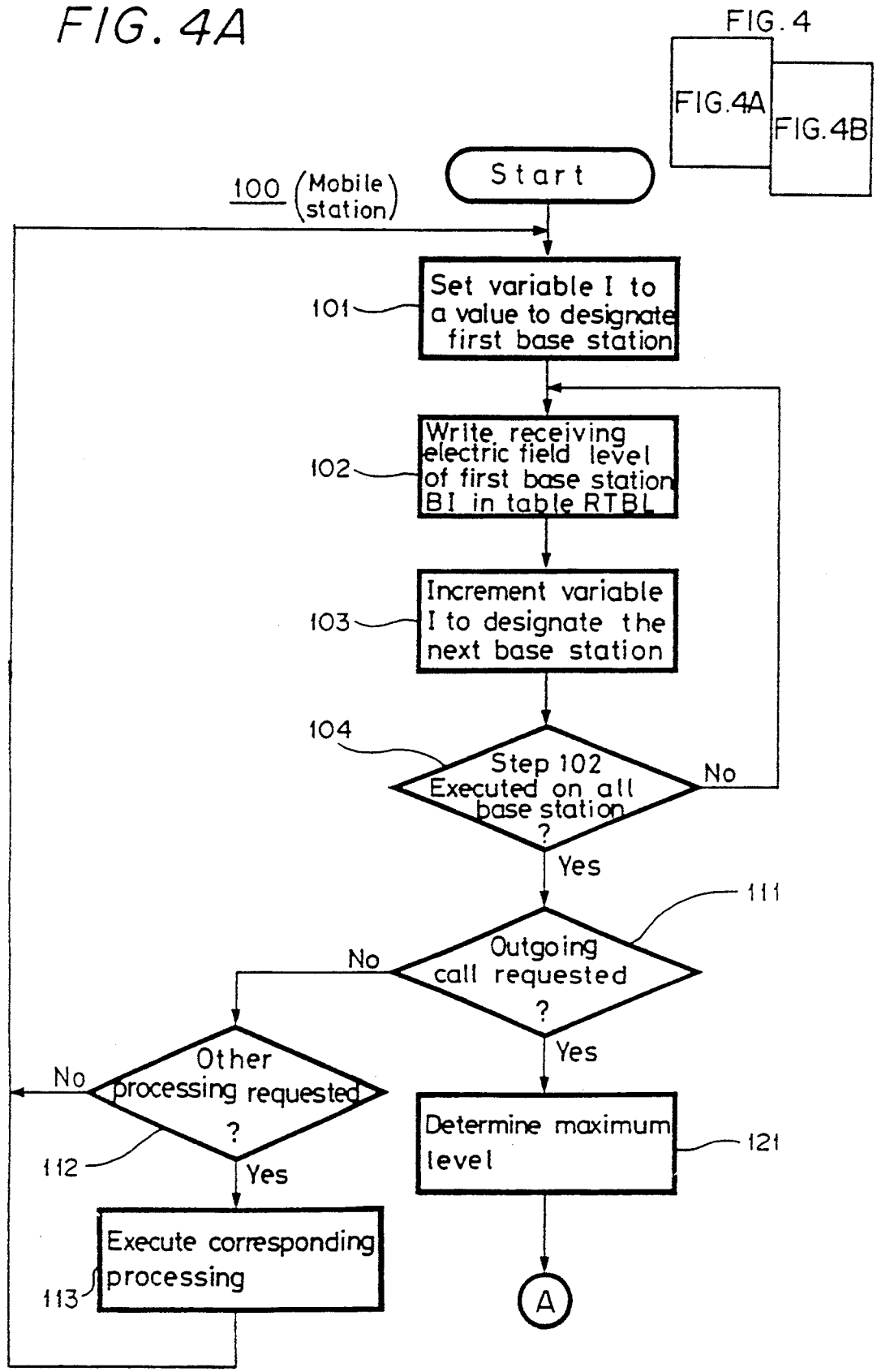
FIG. 4 (formed of FIGS. 4A and 4B) is a flowchart to which references will be made in explaining operation of the radiotelephone communication system of the present invention.
Figure 4B:
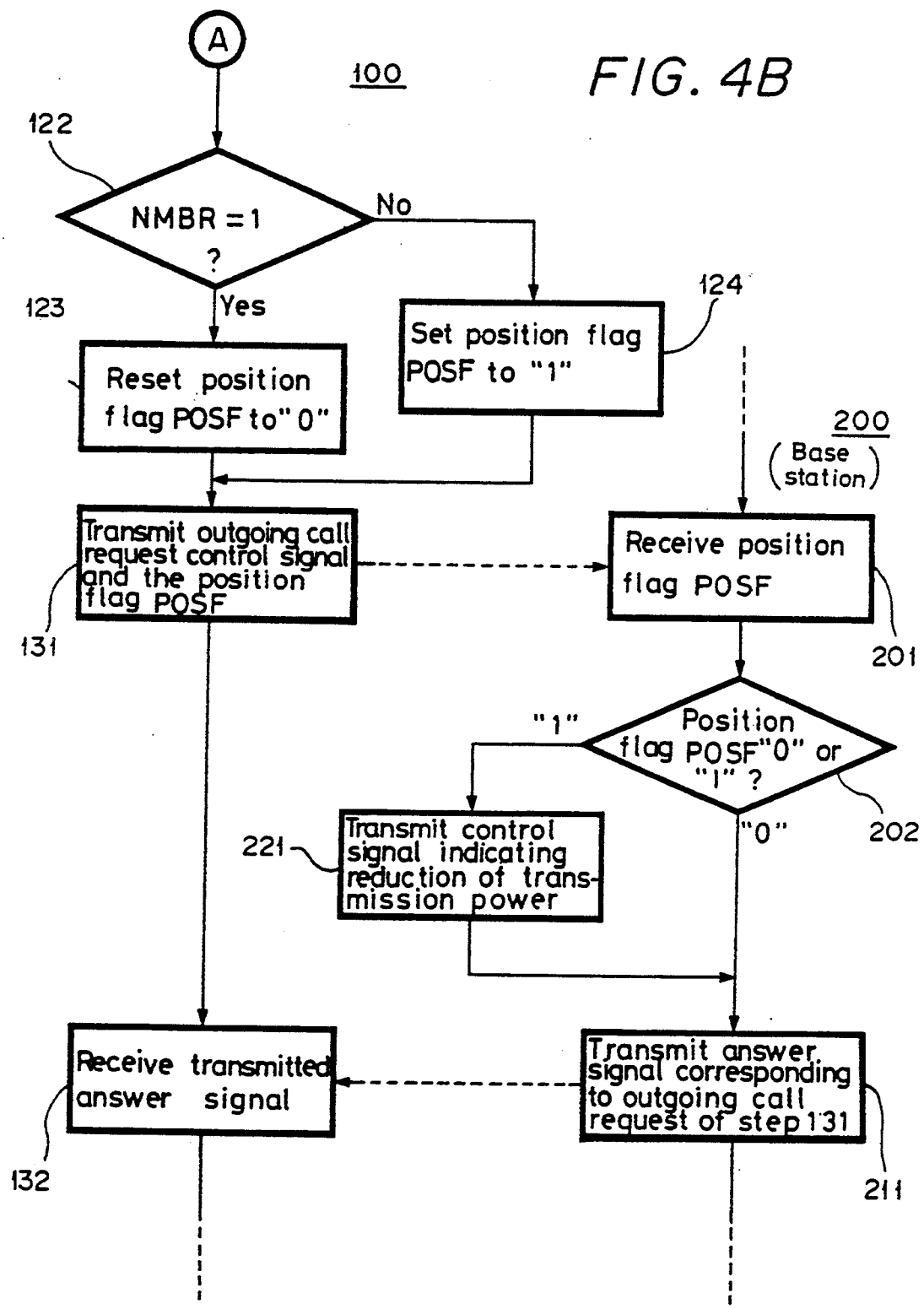

The microcomputer 21 has a memory in which a table RTBL for storing the reception electric field level RLVL indicated by the detected signal Sr and associated data and a position flag POSF are prepared. Also, a processing routine 100 shown, for example, in a flowchart forming FIG. 4 is prepared in the memory of the microcomputer 21. In FIG. 4, reference numeral 200 designates a routine which is executed at an arbitrary base station. In this case, FIG. 4 is formed of FIGS. 4A and 4B drawn on two sheets of drawings so as to permit the use of a suitably large scale. The routine 100 is executed by the microcomputer 21 as follows.

Referring to FIG. 4, following the Start of operation, when a power switch is turned on, the mobile station HS searches the base station. In step 101, a variable I for designating the base station is set to a value by which the first base station is designated. Then, the processing proceeds to step 102, whereat the reception electric field level RLVL of the first base station BI is written in a corresponding position of the table RTBL by the detected signal Sr.

In the next step 103, the variable I is incremented to become a value for designating the next base station. Then, the processing proceeds to the next decision step 104, whereat it is determined whether or not step 102 is executed on all base stations. If step 102 is not yet executed on all base stations as represented by a NO at decision step 104, then the processing returns from step 104 to step 102.

In this fashion, the reception electric field levels RLVL of all base stations are detected and stored in the table RTBL.

Figure 1:
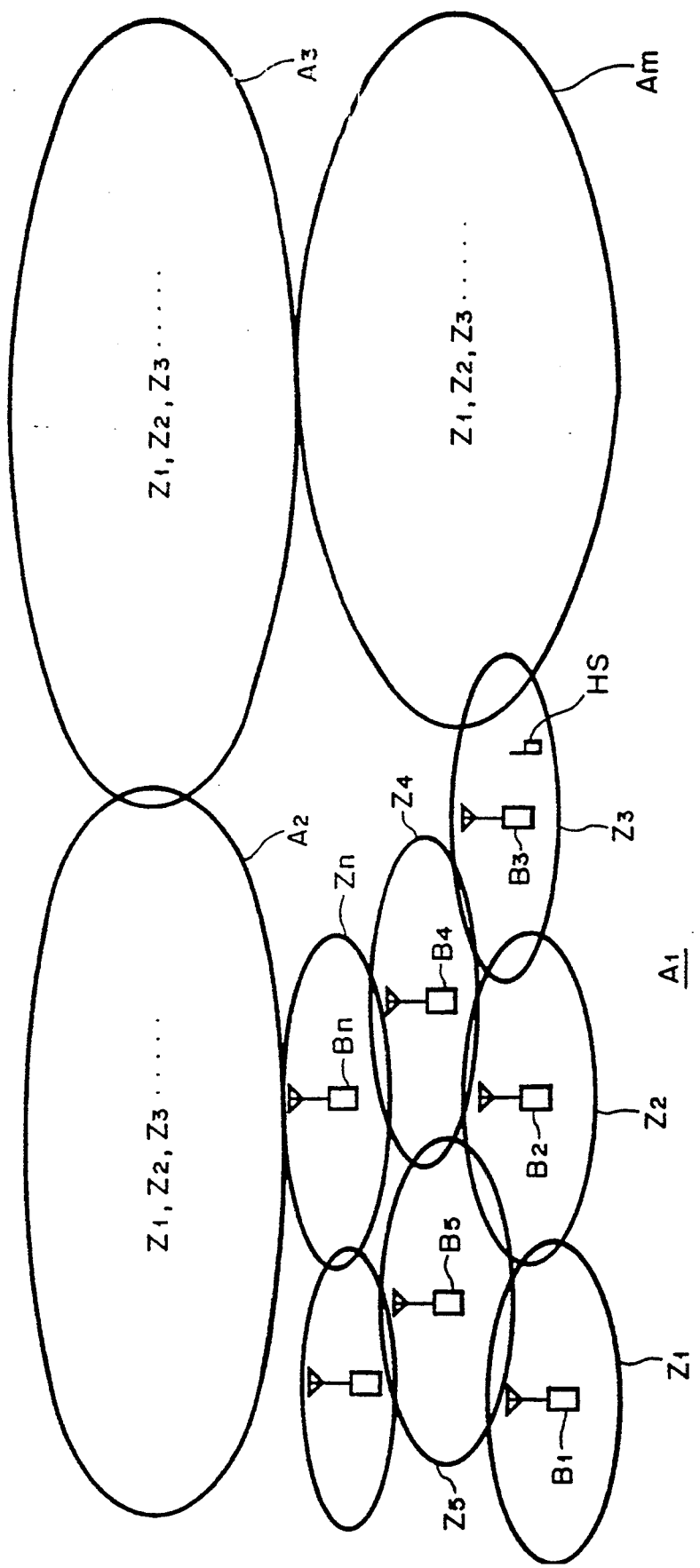
FIGS. 1 and 2 are respectively schematic diagrams used to explain a fundamental principle of a cellular phone system.
Figure 5:
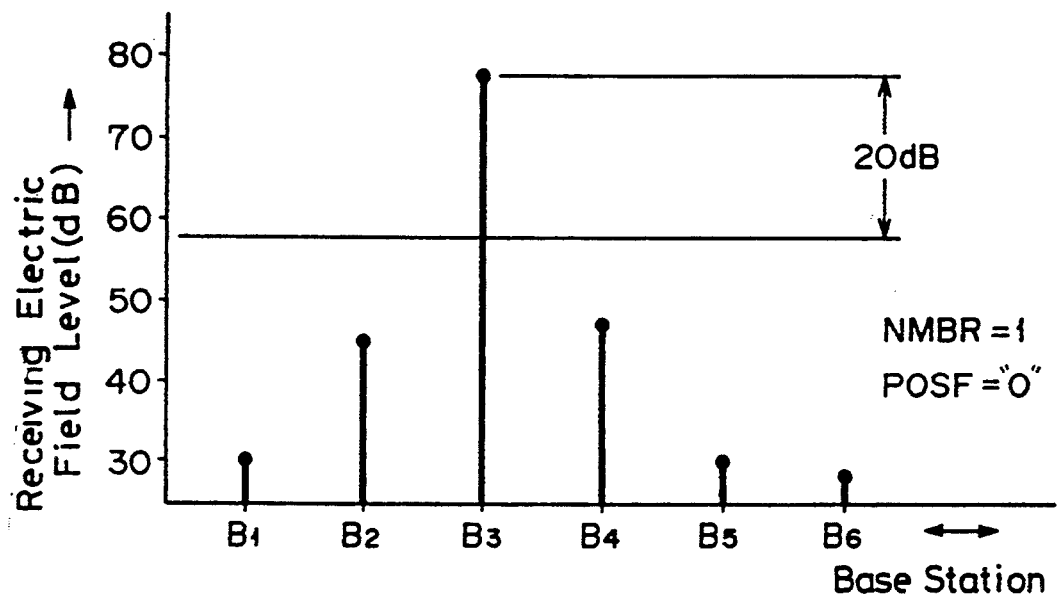
FIGS. 5 and 6 are respectively characteristic graphs used to explain operation of the present invention.

In that case, if the mobile station HS is located in an area where the frequency can be repeatedly utilized from an area standpoint or if the mobile station HS is located within the wireless zone Z3 as, for example, shown in FIG. 1, then the reception electric field levels RLVL of the respective base stations $B_1$ to $B_6 (n=6)$ are presented as, for example, shown in FIG. 5 where the reception electric field level RLVL of the base station $B_3$ of the wireless zone $Z_3$ in which the mobile station HS is located becomes maximum and those of other base stations $B_1$, $B_2$, $B_4$ to $B_n$ become small.

Figure 2:
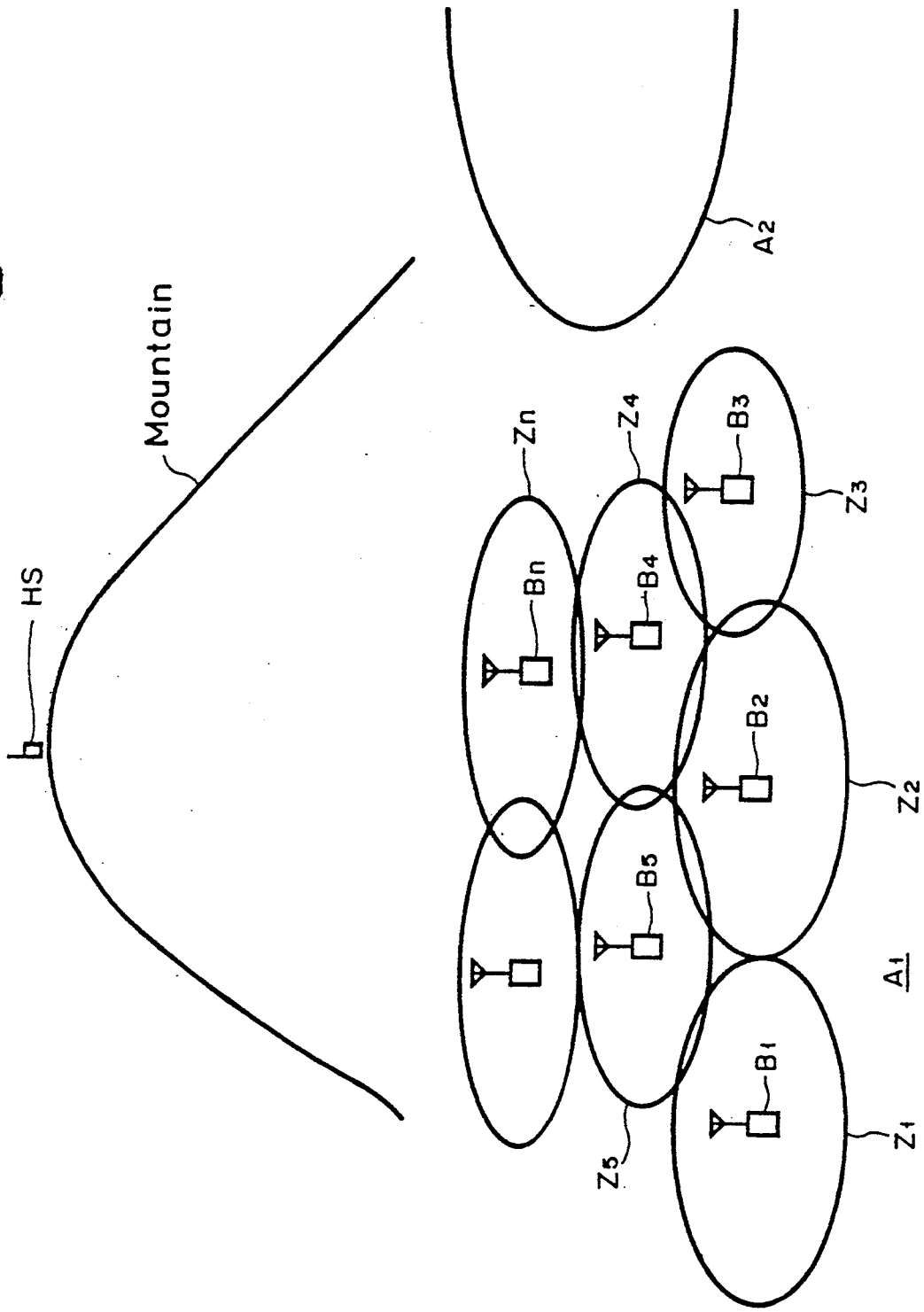
Figure 6:
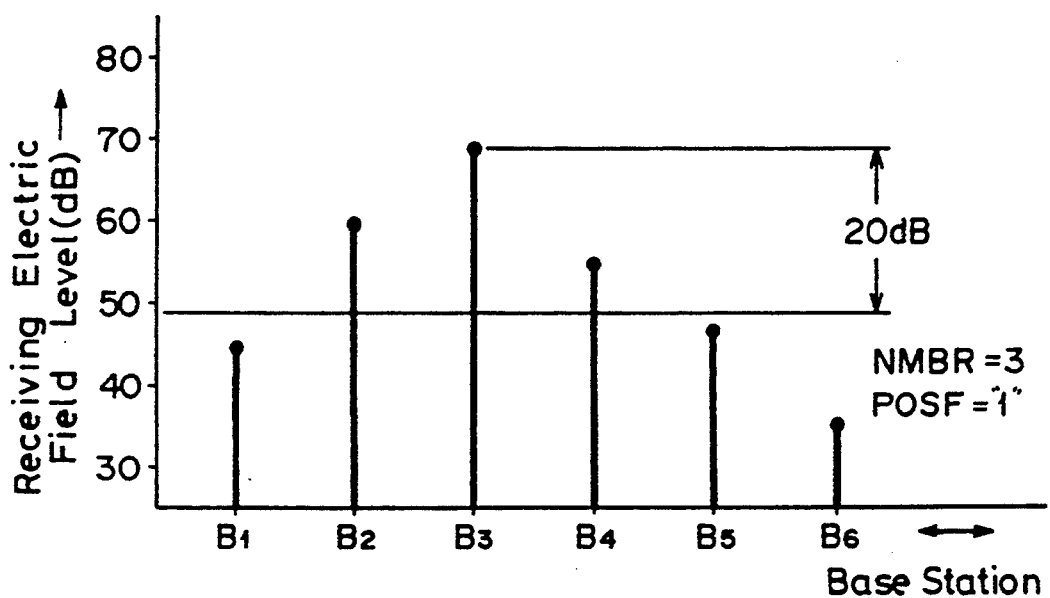

However, if the mobile station HS is located in the place where the frequency cannot be utilized repeatedly from an area standpoint or if the mobile station HS is located on the top of the mountain as, for example, shown in FIG. 2, the reception electric field levels RLVL of the respective base stations $B_1$ to $B_6$ are presented as, for example, shown in FIG. 6 where the reception electric field level RLVL of the base station $B_3$ becomes maximum and those of a plurality of other base stations become substantially the same.

As described above, if the reception electric field levels RLVL of all base stations are stored in the table RTBL, then the processing proceeds from step 104 to the next decision step 111.

It is determined in decision step 111 by checking a talk key (outgoing call key) of the operation key pad 23 (see FIG. 3) whether or not the outgoing call is requested. If the outgoing call is not requested as represented by a NO at decision step 111, then the processing proceeds to the next decision step 112. It is determined in decision step 112 whether or not other processing such as an incoming call or the like is requested. If a NO is output at decision step 112, then the processing returns from step 112 to step 101.

In this way, if it is not requested that the mobile station HS is utilized as the standard telephone, the processing of the microcomputer 21 repeats step 101 to step 112 so that data in the table RTBL are updated constantly. Further, other processing requests such as the request of the outgoing call or the like are also checked at steps 111 and 112.

If it is determined in decision step 112 that other processing is requested, then the processing proceeds from step 112 to step 113. In step 113, the corresponding processing is executed and then the processing returns to step 101.

If the outgoing call is requested while steps 101 to 112 are repeated, then this request of the outgoing call is detected at decision step 111 and, the processing proceeds to step 121. In step 121, the maximum reception level of the reception electric field levels RLVL written in the table RTBL is determined and, then the processing proceeds from step 121 to the next decision step 122.

It is determined in decision step 122 whether or not the number NMBR of the base stations having the reception electric field level RLVL within, for example, 20 dB from the maximum level determined at step 121 is equal to "1".

In the case of, for example, FIG. 5, the reception electric field level RLVL of the base station $B_3$ is maximum and a base station having reception electric field level RLVL within 20 dB from the maximum level is the base station $B_3$ only, thus satisfying NMBR=1. However, in the case of FIG. 6, although the reception electric field level RLVL of the base station $B_3$ is maximum, the base station having reception electric field level RLVL within 20 dB from this maximum level corresponds to the base stations $B_2$, $B_3$ and $B_4$, thus satisfying NMBR=3.

If NMBR=1, then the processing proceeds from step 122 to step 123, whereat the position flag POSF is reset to "0". Then, the processing proceeds to step 131, whereat the outgoing call request control signal and the position flag POSF formed at step 123 are transmitted. In that event, the outgoing call request control signal and the position flag POSF are transmitted to the base station having the maximum reception electric field level determined at step 121, that is, the base station $B_3$ (see FIG. 5) via the up control channel assigned to the base station $B_3$.

Then, in the base station $B_3$, the position flag POSF transmitted at step 131 is received at step 201 in the routine 200. Then, the status of the thus received position flag POSF is checked in decision step 202. In that case, since POSF="0", then the processing proceeds from step 202 to step 211, whereat an outgoing call processing similar to that of the standard mobile radio communication system is performed.

More specifically, in step 211, an answer signal corresponding to the outgoing call request in step 131 is transmitted and, the transmitted answer signal is received in step 132 of the routine 100. Thereafter, the signal processing is performed in the mobile station HS and the base station $B_3$ in accordance with a predetermined protocol with the result that the outgoing call is made by the mobile station HS.

Accordingly, if the position flag POSF is "0", or if the mobile station HS is located in the place where the frequency can be repeatedly utilized from an area standpoint as, for example, shown in FIG. 1, then the processing substantially equal to the ordinary mobile radio communication system is carried out and the outgoing call is realized. Also, the reception of the incoming call or the like is similarly executed in step 113.

However, if NMBR≠1 is satisfied in step 122, or if NMBR=3 is satisfied as, for example, shown in FIG. 4, then the processing proceeds from step 122 to step 124. In step 124, the position flag POSF is set to "1" and the processing proceeds to step 131.

Accordingly, in step 131, the outgoing call request control signal and the position flag POSF generated in step 124 are transmitted. Also in this case, the control signal and the position flag POSF are transmitted to the base station whose reception electric field level RLVL is determined to be maximum at step 121, in that case, the base station $B_3$ (see FIG. 6) via the up control channel allocated to the base station $B_3$.

Therefore, in the base station $B_3$, the position flag POSF transmitted at step 131 is received at step 201 of the routine 200 and identified at the next decision step 202. In that case, since POSF="1", the processing proceeds from step 202 to step 221.

In step 221, a control signal indicating the reduction of the transmission power is transmitted to the mobile station HS. Then, the processing proceeds to step 211, whereat the outgoing call is made in a manner similar to that of the ordinary mobile radio communication system.

As a consequence, in the mobile station HS, the transmission power of the transmitting circuit 12 is reduced than the present value in accordance with the control signal transmitted at step 221. Thereafter, the ordinary outgoing call processing is executed.

Thus, if the position flag POSF is "1", or if the mobile station HS is located in the place where the frequency cannot be repeatedly utilized from an area standpoint as, for example, shown in FIG. 2, then the transmission power of the mobile station HS is reduced as compared with the present value and the outgoing call processing is executed. Also, the incoming call is received similarly by a small transmission power at step 113.

Therefore, in that case, even if the mobile station HS is located in the place where the frequency cannot be repeatedly utilized from an area standpoint, the transmission distance of radio waves can be reduced because the transmission power of the mobile station HS is small. Thus, it becomes possible to utilize the frequency repeatedly.

As described above, according to the present invention, the mobile station measures the electric field intensity of the control channel signal from the base station and the base station analyzes the information associated with the measured electric field intensity, thereby determining, for example, the transmission power of the mobile station in response to the analyzed result.

Accordingly, even if the mobile station is located in the place where the frequency cannot be repeatedly utilized as shown in FIG. 2, the frequency can be utilized repeatedly, thus making it possible to normally realize the fundamental idea or principle of the cellular phone system.

Further, when the base station detects the location of the mobile station to thereby control the mobile station, many base stations detect the reception electric field level of the transmitted radio waves from the mobile station and collect detected results so as to obtain the position information of the mobile station. In addition, there are many mobile stations so that a computer, which controls the base stations, may have a very large burden.

According to this invention, however, since each mobile station obtains its own position information and the base station controls the mobile stations by effectively utilizing the position informations of the mobile stations, the burden on the computer, which controls the base stations, can be alleviated considerably.

A second embodiment of the present invention will be described below.

While the table RTBL is made, this table RTBL is estimated with reference to the reception electric field level and the position flag POSF is transmitted to the base station as the information of the estimated result as described in the first embodiment, the table RTBL itself may be transmitted to the base station or informations indicating the base stations whose reception electric field levels on the table RTBL are higher may be transmitted to the base stations in the order of high reception electric field level.

Let us consider the case such that the position flag POSF is transmitted to the base station. In that case, the base station may treat the mobile station in which POSF="1" is satisfied in a manner different from that of the normal mobile station. That is, instead of reducing the transmission power as described above, the base station is not switched (e.g., hand-off) and the corresponding base station continuously connects the communication channel or the base station connects the mobile station via a special channel of long distance repeatedly.

Further, the reception electric field data of the base station from the mobile station may be regularly transmitted to the base station during communication or such reception electric field data may be transmitted on the basis of the command from the base station during the communication. Furthermore, this concept of the present invention may be utilized together with the prior-art system in which the electric field level of the mobile station is measured by many base stations.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claim.

What is claimed is:

1. A radiotelephone communication system comprising:
    a plurality of mobile radiotelephone stations, each mobile radiotelephone station including:
    station receiving means for receiving a plurality of incoming signals, each of the plurality of incoming signals having a received signal strength level;
    measuring means for measuring the received signal strength level of each of the plurality of incoming signals;
    memory means for storing data associated with the received signal strength level of each of the plurality of incoming signals;
    station transmitting means for transmitting an information associated with said data to one of said base stations via an up-channel; and
    reducing means for reducing a transmission power in response to a control signal; and
    a plurality of base stations, each base station including:
    base receiving means for receiving the information via the up-channel from a mobile radiotelephone station;
    analyzing means for analyzing the information to determine how many incoming signals received by the mobile radiotelephone station have a signal strength level which is within a predetermined range of a highest signal strength level,
    setting means for generating the control signal when the mobile radiotelephone station has an incoming signal with a signal strength level within the predetermined range of the highest signal strength level, the control signal setting the transmission power of the mobile radiotelephone station, and
    base transmitting means for transmitting the control signal to the mobile radiotelephone station.

2. A mobile radiotelephone station for communicating with a radiotelephone communication system, the mobile radiotelephone station comprising:

means for receiving a plurality of incoming signals transmitted from a corresponding plurality of base stations within the radiotelephone communication system, each of the plurality of incoming signals having a received signal strength level;

means for measuring the received signal strength level of each of the plurality of incoming signals to produce signal strength data;

means for evaluating the signal strength data to determine which incoming signal has the largest received signal strength level;

means for evaluating the signal strength data to determine how many of the incoming signals have a signal strength level within a predetermined range of the largest received signal strength level;

means for identifying the base station that transmitted the incoming signal with the largest received signal strength level; and means for transmitting an outgoing signal which identifies the base station having the largest signal strength level, the outgoing signal indicating how many incoming signals have a received signal strength level within the predetermined range of the largest signal strength level.

3. The station of claim 2 and further comprising memory means for storing data associated with the received signal strength level of each of the plurality of incoming signals.

* * * * *